Figure 1:
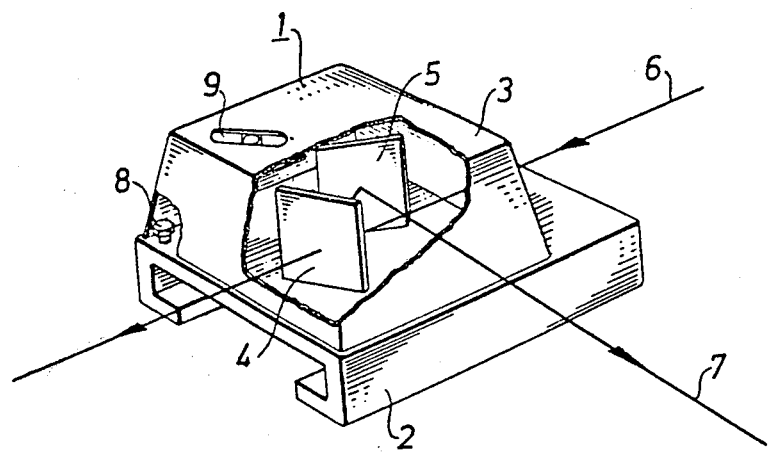

United States Patent [19]
Wickman

[11] 4,441,818
[45] Apr. 10, 1984

[54] DEFLECTION UNIT
[75] Inventor: Kjell J. Wickman, Stockholm, Sweden
[73] Assignee: Pharos AB, Lidingo, Sweden
[21] Appl. No.: 251,735
[22] Filed: Apr. 7, 1981
[30] Foreign Application Priority Data Apr. 23, 1980 [SE] Sweden ............................. 8003082

[51] Int. Cl.³ ...................... G01B 11/26; G01C 1/00; G01C 9/34
[52] U.S. Cl. ........................................ 356/372; 33/290; 350/287; 356/138; 356/249
[58] Field of Search ............... 356/138, 143, 147–149, 356/372, 249, 254; 33/290–291, 421, 428, 282, 451, 382, 390; 350/286–287

[56] References Cited

U.S. PATENT DOCUMENTS

| | | | |
|---|---|---|---|
| 161,155 | 3/1875 | Ransom | 33/382 |
| 456,086 | 7/1891 | Forwood | 33/390 |
| 2,308,206 | 1/1943 | Poland | 33/290 |
| 2,746,163 | 5/1956 | Moritz | 33/390 |
| 3,026,625 | 3/1962 | Carey, Sr. | 33/390 |
| 3,409,993 | 11/1968 | Hansen | 33/390 |
| 3,684,380 | 8/1972 | Benchley, Jr. | 356/138 |
| 3,748,026 | 7/1973 | Scholdstrom | 350/287 |
| 3,765,764 | 10/1973 | Niss | 356/372 |
| 4,277,895 | 7/1981 | Wiklund | 33/366 |

FOREIGN PATENT DOCUMENTS

| | | | |
|---|---|---|---|
| 491707 | 9/1938 | United Kingdom | 350/286 |
| 1161065 | 8/1969 | United Kingdom | 33/290 |

OTHER PUBLICATIONS

Keuffel and Esser, "Right Angles with Pocket Instruments", Advertisement from Keuffel and Esser Co.

*Primary Examiner*—William H. Punter
*Attorney, Agent, or Firm*—Larson and Taylor

[57] ABSTRACT

A deflection unit on a path parallel to a light beam has a rider, which grips the track of a measuring guide (not shown) and permits a beam component to pass while deflecting a component. A levelling means is provided on a line bisecting the angle between the incoming and the deflected beams in or parallel to their common plane to facilitate remote positional measurements of reference points on a body in order to make measurements more accurate.

7 Claims, 3 Drawing Figures

DEFLECTION UNIT

The present invention relates to a deflection unit displaceable along a girder which deflection unit deflects a light beam running along the girder at an angle to the girder.

The modern car with a monoque body is manufactured in large series with accurate precision. The engine, power transmission, front assembly and rear assembly are fitted more or less directly to the body on reinforcements and brackets welded to the body. The function of the car is highly dependent on that the attachment points for e.g. the steering units for the front and rear assemblies always occupy the positions and have the appearance intended by the manufacturer.

In the event of a collision, the impact forces are frequently propagated into the body shell with residual deformations in consequence. Without thorough inspection and measurement, it may be difficult to localize any deformations, and this may have a detrimental effect on the driving characteristics of the car. Compensation for minor deformations in the chassis is possible by means of the adjustment facilities incorporated in the front assembly. Under no circumstances, however, is it acceptable for the attachment positions for the front assembly suspension to be "moved" by enlarging bolt holes etc.

U.S. Pat. No. 3,765,764 discloses an arrangement for checking if a car retains the correct dimensions for the car model concerned, for instance after a collision. The car is hoisted in a device such as a jig or an alignment bench.

The points in a car which are used to check the measurements of the chassis consist of fixture holes and attachment holes for bolts and bolted joints under the car. In order to be able to define these measuring points, use is made of so-called measuring point units which are attached to all relevant checking points in the car chassis. Suspended in each measurement point unit is a ruler which is provided with a millimeter scale and a travelling rider which may be preset at a nominal height level. By reading where a beam of light impinges on the rulers, it is possible to directly determine the height deviations of the chassis. Reflecting colour markings make it easy to check the position of the beam of light in the rulers at a range of several meters.

The light comes from a laser which emits a virtually parallel red beam of light along a lengthwise girder. The beam of light strikes a deflection unit where it is divided into two beams perpendicular to each other. One light beam continues along the aforesaid lengthwise girder while the other is directed at right angles out from the said girder. When the deflection unit, which is movable, is moved along the lengthwise girder, the perpendicular light beam will also be displaced along the girder and impinge on one ruler at a time. The distance between the rulers can then be directly read off on a measuring tape line of roll-up type which is located on the lengthwise girder.

It is essential for the deflected light beam to be correctly positioned in the vertical direction. For this reason, earlier deflection devices have been equipped with two levels, one of which senses the horizontal position of the deflection unit along the girder and the other the horizontal position in the direction of the deflected light beam. At each measurement location for the unit along the girder the operator adjusts the unit so that both levels indicate the correct position with two adjusting screws. Since it is desired to achieve as few work operations as possible, this implies a disadvantage.

In accordance with the invention a vertical angle sensor is located to sense the vertical angle of the bisectrix between said light beam running along the girder and said deflected light beam for the purpose of setting the deflection unit so that the vertical angle sensor shows a predetermined angular value.

In a accordance with a further property of the invention the vertical angle sensor is a level. The vertical angle sensor may also be a sensor with an electrically discernible vertical angle such as a pendulum accelerometer which cooperates with a setting device which sets the deflection unit so that the angle sensor shows the predetermined angular value. In this case the setting device may consist of a servo, whereby the vertical angle sensor senses the set point value and a servo motor drives the setting device.

In accordance with a still further embodiment of the invention the deflection unit for the purpose of deflection comprises two reflective surfaces set at right angles to a plane in which both the light beam running along the girder and the deflected light beam are going, and in that the bisectrix between the reflective surfaces are coincident with the bisectrix between said light beams. Also, the deflection unit according to the invention can be resting on said girder or on a rider movable along said girder so that it is turnable around an axis parallel to the light beam running along said girder; in that the vertical angle sensor is set to zero by means of a sensor adjusting device and a turning unit of said deflected beam to hit a first reference point on an object to be measured, and in that setting of said unit at measurements to other reference points are made by turning said unit around said axis by means of said turning unit.

Figure 3:
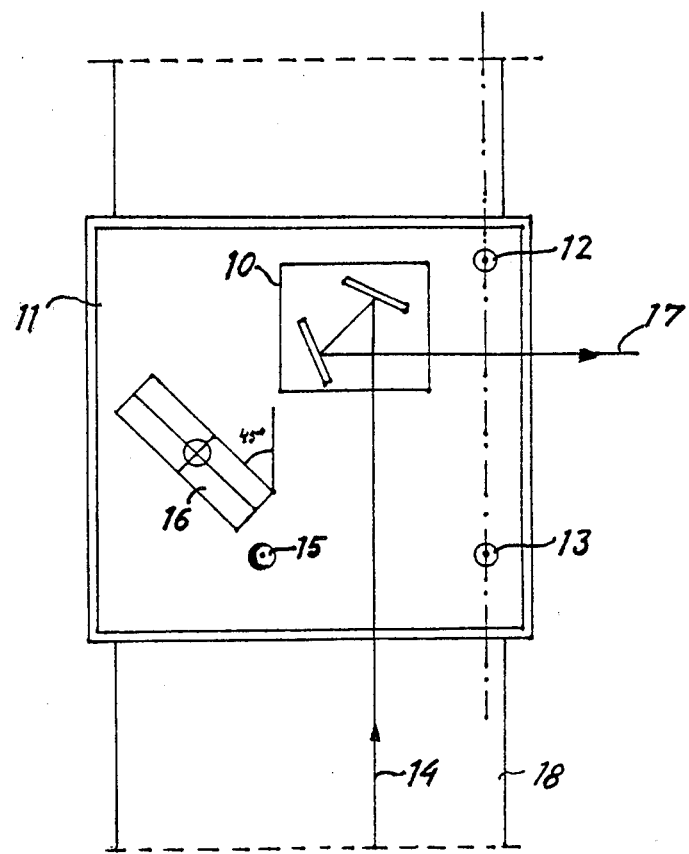
Figure 2:
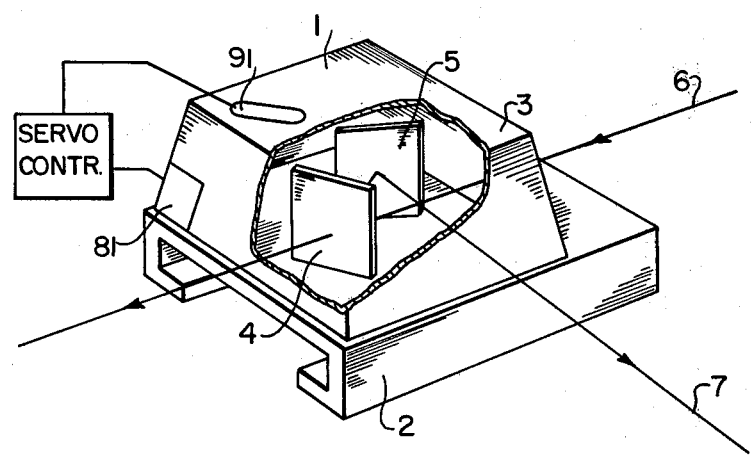

A more detailed description of the invention now follows, wherein reference is made to the accompanying drawing, in which FIG. 1 shows a partly broken perspective view of an embodiment of a deflection unit according to the invention, FIG. 2 is similar to FIG. 1 and shows a modification thereof, and FIG. 3 shows a principle top view of another embodiment of a deflection unit according to the invention.

The deflection unit 1 comprises a rider 2 which grips the measuring girder (not shown) along which the deflection unit can be moved. Resiliently attached to the rider is an optics housing 3. Since the deflection unit 1, upon being moved along the measuring girder, obtains deviations of varying magnitude from a desired horizontal position depending on relatively negligible faults in the path of travel of the measuring girder or in its bearing arrangements, the said deflection unit must be adjusted every time it has been moved to a measuring position. Shown in the optics housing are two mirrors 4 and 5 set at an angle to each other and perpendicular to the bottom of the optics housing 3. The mirror 4 is appropriately semitransparent. The angle between the mirrors is dependent upon at which angle $\phi$ the light beam 6 entering along the girder is to be deflected relative to the girder. The angle between the mirrors is $90° - \phi/2$. In rectangular deflection, the angle between the mirrors is thus 45°. The setting in order for the deflected beam 7 to lie in the horizontal plane is accomplished by means of an adjusting screw 8 so that the air bubble in a level placed on the top of the optics housing takes up a position within the level markings. That is, the deflection unit is rotated about an axis which is within a plane perpendicular to the measuring plane and perpendicular to the line which bisects the angle between the beam to be deflected and the deflected beam, wherein the measuring plane is the plane containing both the beam to be deflected and the deflected beam. The level is aligned along the bisectrix for the angle between the impinging beam 6 and the outgoing beam 7. However, for symmetry reasons it is favourable to mount the mirrors 4 and 5 so that the bisectrix between the mirrors at least approximately coinsides with the bisectrix of the angle between the impinging beam 6 and the outgoing beam 7. In a construction having a rider sliding along a girder it is very difficult to guarantee against skewness of the girder and this results in that the deflection pentagon unit has to be adjusted at each change of position of the deflection unit. The plane including the impinging beam 6 and the deflected beam 7 define a measuring plane.

Instead of a level, the unit 3 can be provided with an angle meter of accelerometer type, for example that described in U.S. Pat. No. 4,277,895. In the event that the unit is to be remotely controlled or that automatic levelling of the unit is always wanted and referring to FIG. 2, the unit can be equipped with an electrically controllable setting means 81 which, through servo control means, cooperates with the angle sensor 91 so that the unit is set so that the angle sensor 91 constantly shows the angle value 0°.

In such cases where deflection of the beam is desirable even in the vertical direction, the setting may be performed by turning of the bisectrix for the angle between the mirrors so that it becomes inclined towards the horizontal plane. The suitable angle is adjusted with the screw 8 or the automatically adjustable switching means 81 so that the angle sensor shows the angle of inclination concerned.

Another embodiment of the invention is shown in FIG. 3. The deflection unit 10 having mirrors placed in analogy with a pentagon prism is in this embodiment located on a level plate 11. It is possible to tip the level plate around an axis formed between two centers 12 and 13. They are so situated that a line between their tips in the direction of the girder is parallel to the impinging laser beam 14. The tipping is accomplished by turning of a threaded center 15, which is situated at a distance from the line between the centers 12 and 13. That is, the deflection is rotated about an axis which is within a plane perpendicular to the measuring plane and parallel to said beam to be deflected The level plate 11 is resting on the three centers 12, 13 and 15. In turn the three centers are resting on a rider 2 (see FIG. 1), which grips the girder. It is also possible for the centers to rest on a groove directly on the girder.

A level 16 is located parallel to the bisectrix of the impinging beam 14 and the outgoing beam 17. For symmetry reasons the mirrors of the unit 10 are placed so that the bisectrix between the mirrors coincides with the bisectrix between the impinging and the outgoing beam. Since in this case the mirrors are bending the impinging beam 14 at an angle of 90°, the level is located at an angle of 45° to the impinging beam. When the deflection unit is set so that the outgoing beam will hit a first reference point of an object to be measured, for instance a car, both the threaded center 15 as well as a screw (not shown) with which the level 16 itself is adjusted into a horizontal level are adjusted.

At all the further measurements towards other reference points at the object the adjustment of the level 16 is not changed. Only the threaded center 15 is adjusted.

By keeping the bisectrix axle of the pentagon unit 10 at a constant angle in relation to the impinging laser beam 14, irrespective of possible inclination of the girder, by means of the center 15 and the level 16, it is possible to keep the direction of the outgoing laser beam 17 constant.

Because the tipping of the outgoing laser beam is deliberately made around an axis parallel to the impinging laser beam no lateral turning error of the outgoing laser beam will occur.

Naturally, any other type of axis than one going through the tips of two centers 12 and 13 is possible. Also, the turning around the axis can be made in some other way than by having a threaded center 15. If for instance a pendulum accelerometer or some other type of vertical angle sensor having an automatic electrical level signal indication is used instead of the level 16, the turning around the axis can be made by means of a small rotating setting motor, which is turning the level plate around a fixed axle. The setting to zero of the vertical angle sensor is made at the measuring to a first reference point.

I claim:

1. A controllable light beam deflection apparatus for deflecting a light beam such that it travels in a predetermined measuring plane, comprising:
    a beam deflection unit displaceable along a guide which extends substantially parallel to the light beam to be deflected, and
    a level sensor comprising means for sensing the level deviation within a plane parallel to the measuring plane and along a line that bisects the angle between the beam to be deflected and the deflected beam for rotationally setting the deflection unit about an axis which is within a plane perpendicular to said measuring plane and perpendicular to said line.

2. A deflection apparatus according to claim 1, characterized in that the sensor is a spirit level.

3. A deflection apparatus according to claim 1, characterized in that the sensor has an electrical output related to the deflection of the sensor from a level position parallel to the measuring plane.

4. A deflection apparatus according to claim 3, including a setting device controlled by the output of the sensor to set the beam deflection unit so that the output of the sensor has a predetermined value.

5. A deflection apparatus according to claim 3, characterized in that the sensor is a pendulum accelerometer which cooperates with a setting device which is adapted to set the beam deflection unit so that the output of the accelerometer has a predetermined value.

6. A deflection apparatus according to claim 1, characterized in that the beam deflection unit has two reflective surfaces set at right angles to a measuring plane containing both the beam to be deflected and the deflected beam.

7. A controllable light beam deflection apparatus for deflecting a light beam such that it travels in a predetermined measuring plane comprising:
    a beam deflection unit displaceable along a guide which extends substantially parallel to the light beam to be deflected, and a level sensor comprising means for sensing the level deviation within a plane parallel to the measuring plane and along a line that bisects the angle between the beam to be deflected and the deflecting beam for rotationally setting the unit about an axis which is within a plane perpendicular to said measuring plane and parallel to said beam to be deflected.

* * * * *